March 31, 1964  T. A. CIARLARIELLO  3,126,904
RESPONSE IN AUTOMATIC CONTROL
Filed Sept. 1, 1960  7 Sheets-Sheet 1

INVENTOR
THOMAS A. CIARLARIELLO.
BY
Brown, Critchlow, Flick & Peckham
HIS ATTORNEYS March 31, 1964     T. A. CIARLARIELLO     3,126,904
RESPONSE IN AUTOMATIC CONTROL Filed Sept. 1, 1960     7 Sheets-Sheet 2

AMPLITUDE FREQUENCY RESPONSE

March 31, 1964  T. A. CIARLARIELLO  3,126,904
RESPONSE IN AUTOMATIC CONTROL
Filed Sept. 1, 1960  7 Sheets-Sheet 5
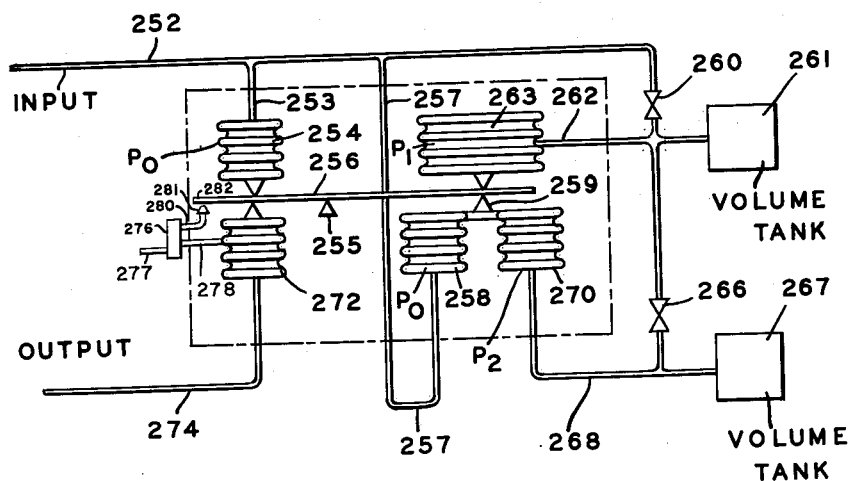
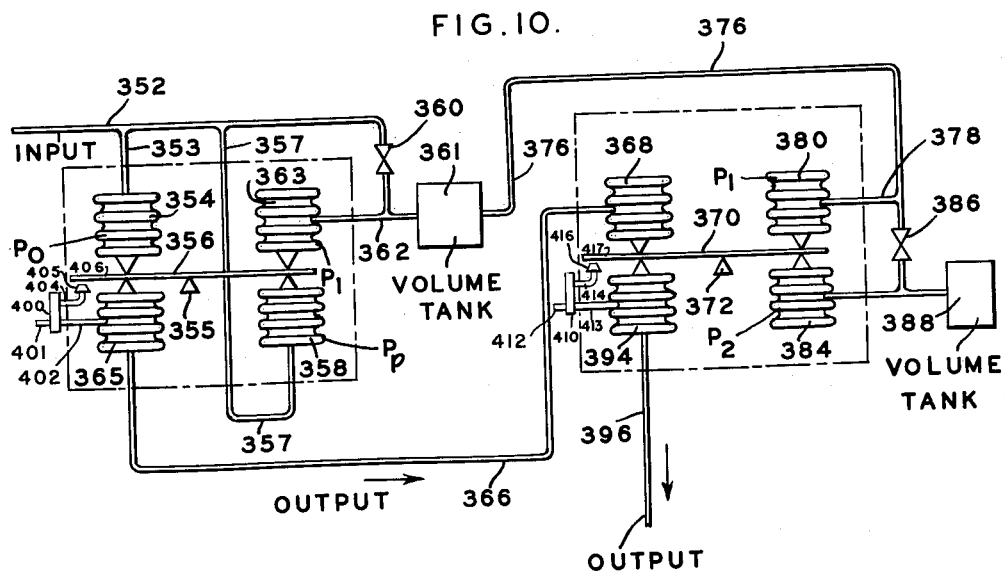

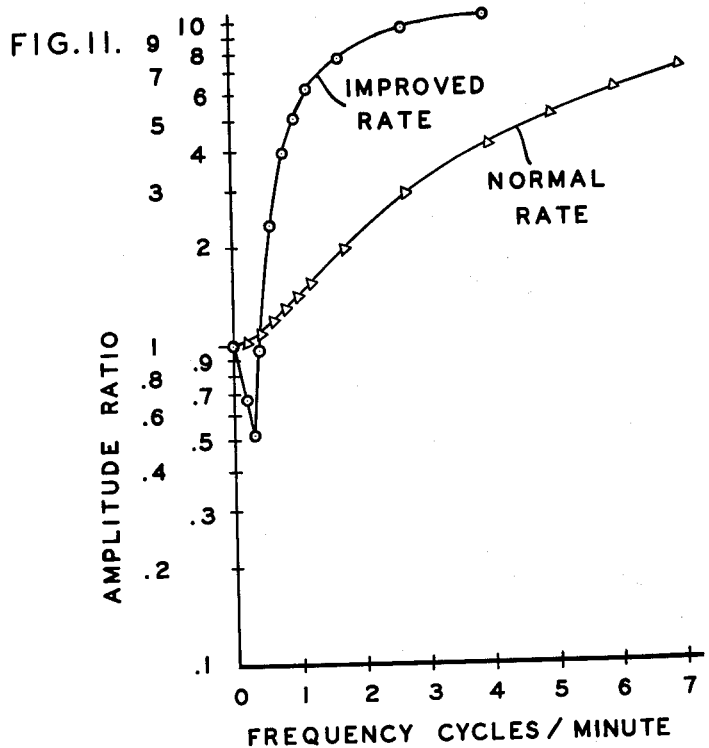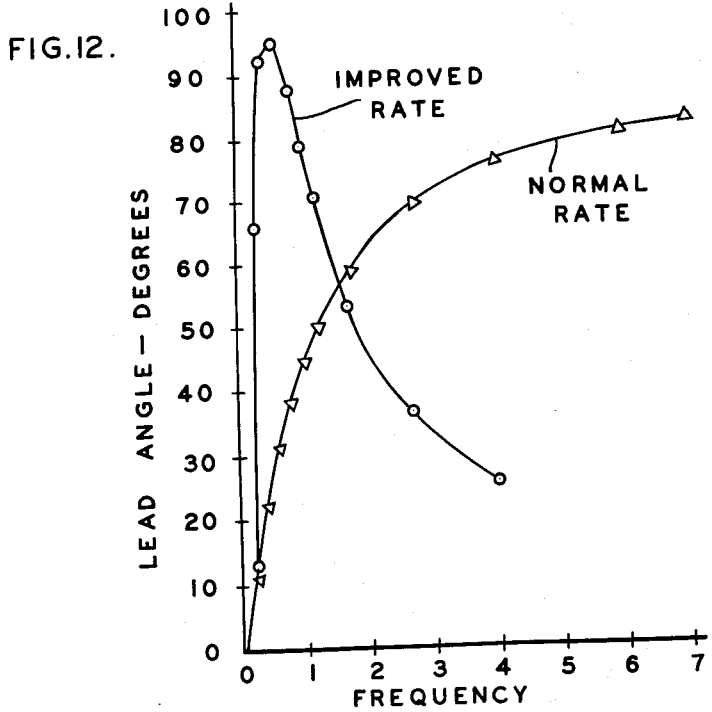

3,126,904
RESPONSE IN AUTOMATIC CONTROL
Thomas A. Ciarlariello, Evans City, Pa., assignor to M.S.A. Research Corp., Pittsburgh, Pa., a corporation of Pennsylvania
Filed Sept. 1, 1960, Ser. No. 53,464
9 Claims. (Cl. 137—85)

This invention relates to the provision of improved automatic control of a physical condition, such as flow, temperature, pressure, speed or the like, generally in an industrial procedure such as a chemical manufacturing operation.

Automatic control systems presently are widely used and the number of such installations is increasing rapidly. These controls provide increased safety, improved yields, improved product quality and a decrease in operating costs as a consequence of reduced manpower requirements.

In automatic control systems, it is a function of the controller to maintain some key variable equal at all times to some desired value. Ordinarily this is accomplished by feeding to the controller information indicating this predetermined desired value, and having the controller operative to send a corrective signal to a controlling element in response to variations of the actual level of the variable from the predetermined value.

In some automatic control systems, the manner of influencing the controlled variable is by proportional action. Proportional action merely provides a particular controller output for a particular deviation. The controller output in proportional action is linearly proportional to the deviation of the controlled variable from the desired value. Therefore, the controlled system following a load change can level out only with a sufficient deviation to insure enough controller output to balance the new load. A disadvantage of proportional control is that it permits a sustained deviation of the controlled variable from the set point.

One way of securing proportional control is through the use of a proportional band controller, a device now well known in the art. A proportional band of such a controller is normally expressed as a percentage of the full scale travel of the controller. For example, with a controller that can indicate a temperature between 400° and 1000° F., a proportional band setting of 8 percent indicates that the width of the band (total) is 48° F. [i.e.

$$\frac{8}{100}(1000-400)\bigg]$$

Since the set point of such a controller is one-half of the proportional band, it will be evident that a temperature change of but 24° F. would be required to move the controlled element to the extremes of position from the set point. If a narrower proportional band setting of one percent were achieved in the foregoing example, a temperature width of 6° F. or a maximum of ±3° F. deviation would be available. Moreover, the narrower band would produce a faster change back to the desired temperature. Accordingly, the process temperature would be far better controlled with the narrower band. For this reason, as well as the fact of less expense, narrower band controllers are preferable.

It is not always possible to achieve a narrow proportional band. For a given system, the response of the controlled variable to successively narrower proportional bands is such that a point is reached where the controlled variable oscillates about the set-point with constant amplitude or even increasing amplitude. Neither of these conditions can be tolerated in many processes. Moreover, time delays which are inherently present in any system, are deleterious to automatic control and require a very wide proportional band setting to obtain stable response.

In accordance with my discoveries, the inherent and practical limitations on securing fine or narrow control of a controllable variable that characterize prior art systems are overcome and there is provided finer control than would be considered possible, as measured by the frequency-response characteristics of the system being controlled. Application of these discoveries can be made to existing controlled systems without disruption of the existing system and at but relatively small cost.

As noted above, for any given system there is a minimum proportional band setting that can be used for control while achieving the desired results of leveling out the value of the controlled variable in response to the control command; stated otherwise, a minimum setting exists beyond which a narrow setting of a proportional band would result in continuous oscillation of the controlled variable. As a consequence of my discoveries, the narrow seemingly inherently unstable setting can be achieved with resultant finer control. This is accomplished by intercepting, in a control loop between the point of the application of the correction to enable a return to the desired state, the traveling signal, adding a first lag analogue of that signal to it and subtracting from the resulting sum a second lag analogue of the traveling signal; the time constants of the lag analogues must differ from one another, with the lag that is being subtracted having the smaller time constant, and hence, being a lower lag. The signal resulting from this modification then constitutes the command, or the signal traveling in the control loop beyond the point of interception, by which automatic control of the controller variable is had.

It may be noted that the intercepted signal is of a zero order, and the high and low lag analogues of that signal are of a first or higher order level. It is further to be noted that the interception and the modification of the signal in accordance with my discoveries can be accomplished between the automatic control and the point at which the variable is sensed, in the automatic control means itself, or between the automatic control means and the point of the application of the control correction. The last of these three places of application is preferred because the visual controller information given under those circumstances is more intelligible to the average operator than it would otherwise be because in that arrangement, the visual control information will be the actual value of the controlled variable. It should be understood that the term traveling signal indicates the signal at any point of interception.

It is, therefore, evident that practice of the invention requires the creation of at least two different lag analogues of the traveling signal and the addition of the larger of those lags and the subtraction of the smaller to the traveling signal to provide what might be termed a new information signal that then is used for control purposes. Lag analogues of a first or higher order of a signal are produced by use of the well known "resistance-capacitance" (RC) circuit, with a first order lag analogue being created with a single RC circuit, a second order lag analogue being achieved with two RC circuits in series, and so on.

"Resistance-capacitance" circuits as well as their characteristics are well known in the controller art. Among the types of systems in which RC circuits can be provided are included pneumatic, electric, thermal, hydraulic, mechanical and others. For example, in a D.C. electrical circuit, an electrical resistance and capacitance in series, with input going to the resistance and output being taken from a tap between the resistance and capacitance, constitutes an RC circuit. In pneumatic systems, the combination of a flow restriction, such as a throttle valve, capillary tube or the like, and a volume chamber constitutes a first order lag system or an RC circuit. The hydraulic system could be provided with a bellows and a spring; an orifice or throttle valve could be used for a flow restriction and a spring loaded bellows could be used for a volume tank. For a thermal system, a block of copper or other heat absorber could function as a capacitance and the resistance could be a layer of insulation. Generally, the type system to be used is indicated by the nature of the traveling signal. An electrical system normally would be used for control loops using electrical signals, while a pneumatic system usually would be adopted where an air pressure constituted the signal. Of course, hybrid systems also could be used; for example, a thermal signal could be converted to an air pressure that could be used with a pneumatic system such as a flow restriction and volume chamber. Other examples are readily apparent in view of the foregoing. The product of a resistance and capacitance in any system has the dimensions of time, and constitutes the time-constant which is a characteristic of RC circuits.

Once the high and low lag analogues of the traveling signal have been produced, they are used in accordance with my discoveries by adding the high lag and subtracting the low lag from the signal of which they are analogues, thereby to produce a new signal that is used to bring about control. A commercially available device that can be used for this purpose when pneumatic signals are being used is a pneumatic bellows relay. A specific example of such a means will be described hereinafter when the drawings are discussed.

Reviewing the invention again with a device such as a pneumatic relay in mind, the essence of the invention can be restated as involving the use of two time delayed feedbacks, one positive and one negative, of the incoming signal to the relay. One delayed time signal is added and one time delayed signal is subtracted from the input signal to provide the new control signal. Considered mathematically:

$$P = AP_0 + BP_1 - CP_2$$

where $P$ = output pressure
$P_0$ = input signal
$P_1$ = delayed input signal
$P_2$ = delayed input signal
A, B, C = arbitrary constants As will be pointed out hereinafter, more than two feedbacks of the incoming signal can be used if even finer control is desired.

Further consideration of the invention is best accomplished in conjunction with the attached drawings in which:

FIG. 9 shows diagrammatically a rate action bellows system modified for purposes of this invention;

FIG. 10 shows another arrangement of bellows by which improved rate action in accordance with this invention can be achieved;

FIG. 11 shows curves of amplitude ratio versus frequency of conventional rate systems and of the improved rate of this invention;

FIG. 12 shows curves of lag angles versus frequency of conventional rate action and of the improved rate of this invention;

Figure 1:
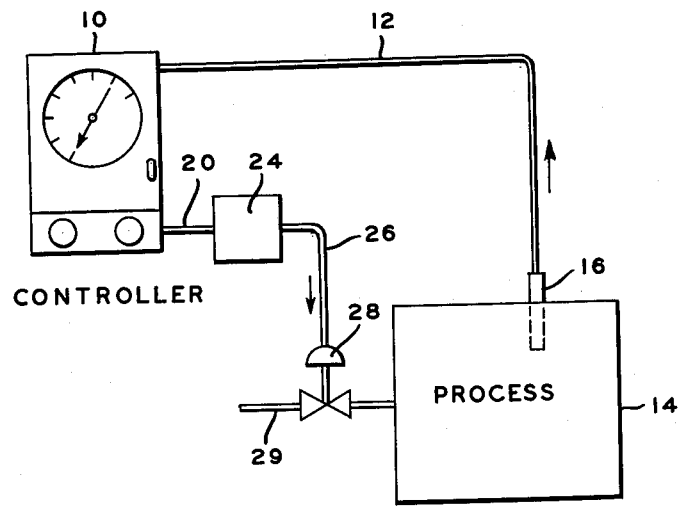
FIG. 1 illustrates diagrammatically a chemical system showing a process control loop including a controller and control influencing means in accordance with this invention.

Referring now to FIG. 1, there is shown, diagrammatically, a process control loop. The process being controlled is indicated generally at 14. System temperature is sensed by a means 16 extending to within the process zone 14. The sensed temperature is passed through a line 12 to a proportional controller 10. For ease of consideration of the invention, it may be considered that the transmitted signal is an air pressure, though it will be understood that other type information transmitting media can be used as well.

The controller 10, previously given a set point for the system, makes its natural correction and the modified signal leaves the controller through line 20. The signal then enters means 24, which creates two lag analogues thereof and provides an output signal comprising the input signal plus a first lag analogue minus a second lower lag analogue. The signal then is conveyed through line 26 to the process control valve 28, which adjusts input flow to the process system 14 through inlet conduit 29 to thereby bring the temperature to the desired level.

Figure 2:
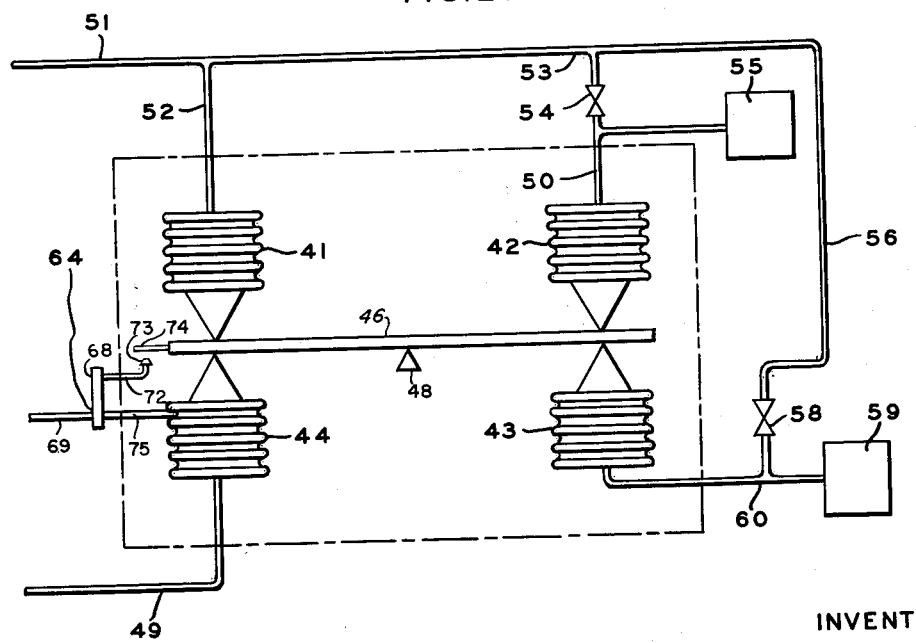
FIG. 2 shows diagrammatically a pneumatic bellows modified for purposes of the invention.

As noted above, the creation of lag analogues and their summation can be made with a modified commercial pneumatic bellows. One suitable arrangement for that purpose is shown in FIG. 2. For purposes of description, it is to be assumed that the relay is located between the controller and valve, as is shown diagrammatically at 24 in FIG. 1.

Referring to FIG. 2 the pneumatic relay comprises four bellows 41, 42, 43, and 44 that are placed two on a side of a force bar 46 pivoted on a fulcrum 48. An output line 49 leads from bellows 44 to the controller valve (FIG. 2). A signal input line 51 from the controller (10 in FIG. 1) leads into the relay. A first line 52 therefrom leads to bellows 41. A second line 53 leads through a valve 54 to a volume chamber 55. Intermediate valve 54 and volume chamber 55 is a tap-off line 50 leading to bellows 42. A third line 56 leads the signal from the input line 51 through a second valve 58 to a volume chamber 59, and has a tap-off line 60 between valve 58 and chamber 59 that leads to the third bellows 43.

A first portion of the input signal from the controller thus exerts a force on bellows 41. That in turn pushes against the force bar 46 and establishes a counterclockwise moment around the force bar fulcrum. This moment is directly proportional to the incoming air signal. The second portion of the signal is led through valve 54 to volume chamber 55. The combination of the flow restriction valve 54 and the volume chamber 55 comprises a first order lag system. The pressure in the volume chamber is then is then the first order lag of the input signal. This pressure is led through line 50 to bellows 42 and sets up a clockwise moment about the fulcrum.

The third portion of the input signal, i.e., the air pressure, is fed through the flow restriction valve 58 to volume chamber 59, thus establishing another first first lag analogue of the input signal. This pressure then goes through line 60 to bellows 43, where it sets up a counterclockwise moment about the fulcrum. By suitable adjustment of the flow restrictions and size of the volume chambers, the time constant for each RC system is established. In this example, the time constant of the RC system associated with bellows 43 is higher than that of the RC system providing the pressure on bellows 42. Therefore, the pressure of bellows 43 lags behind the pressure of bellows 42, i.e. is a high lag relative to that of bellows 42.

The fourth bellows 44 exerts a clockwise moment about the fulcrum in the pneumatic relay. A convention air supply and pilot relay valve system indicated generally by the numeral 64 is provided to either add or remove air from bellows 44 in the usual manner, depending on the position of the force balance lever 46 relative to the horizontal position. The relay system 64 comprises a vessel 68 having an air supply 69, an air outlet 72 terminating in a nozzle 73 at a flapper valve 74 attached to force bar 46, and an air line 75 to bellows 44. The internal operative parts (not shown) include an air distribution system, a diaphragm to sense pressure in response to the relative positions of the flapper valve 74 and nozzle 73, and valve means responsive to the diaphragm to control air supply to bellows 44 through line 75. In operation when flapper 74 closes nozzle 73 (in response to increased moment about the force bar), the diaphragm senses the increased pressure and acts on the valve means to increase the air supply to bellows 44 and therefore the output in line 49. With lessened moment of the force bar, the flapper moves away from nozzle 73, thereby decreasing pressure on the diaphragm and permitting the valve means to decrease air supply (and therefore the pressure) to bellows 44 whereby a decreased output in 49 results. The bar 46 is thus always returned to the horizontal position and accordingly, the moment of bellows 44 and bellows 42 equals the moment generated by bellows 41 and 43. The pressure in bellows 44 is then given by $$P_{44} = P_{41} + C(P_{43} - P_{42})$$

where C is a proportionality constant depending on the position of the flucrum 48. It can thus be observed that the pressure of bellows 44 is that which is necessary in the practice of my invention, for it consists of the required addition of a zero order pressure $P_{41}$ and a high lag pressure $P_{43}$ and the subtraction of a low lag pressure $P_{42}$, the latter two pressures being analogues of the zero order pressure.

As noted hereinbefore, the lags of the input signal need not be of the same order. A modification of the relay can be made so that the lags produced and summed are of different orders. Such a modification is shown in FIG. 3.

Figure 3:
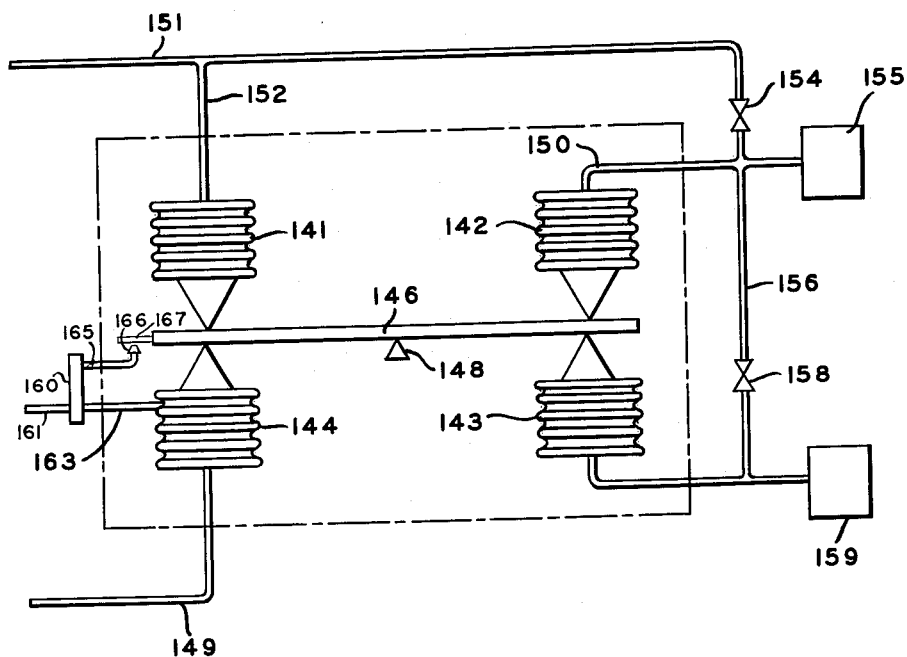
FIG. 3 shows a second modification of a bellows system as in FIG. 2.

In FIG. 3, a first portion of the input signal air pressure in line 151 goes through a line 152 to the first bellows 141. A second portion of that air pressure goes through a flow restriction valve 154 to a first volume chamber 155 and then through a line 150 to the second bellows 142. The air pressure for bellows 143 is provided by a tap-off line 156 from line 150. That first order lag pressure passes through a flow restriction valve 158 to a volume chamber 159 and then goes through line 160 to bellows 143. A line 149 leads out of the relay from the fourth bellows 144. A pilot relay system comprised of a vessel 160, an air supply line 161, an air line 163 to bellows 144, an air line 165 and nozzle 166 at a flapper valve 167 on force bar 146 is provided to admit or decrease air supply to bellows 144, and therefore its outlet line 149. This operates in the manner described above in conjunction with FIG. 2.

Hence, the pressure of bellows 143 is a second order lag pressure. As before, it is added to the zero order pressure of bellows 141. The output signal of bellows 144 is the result of adding a high second order lag (bellows 143) to the zero order signal (bellows 141), and subtracting the low first order lag of bellows 142 therefrom.

A specific application of the invention by which its advantages can be observed can now be described. For this purpose, the system being controlled can be a chemical process, as shown in FIG. 1, the variable sensed being the process operating temperature, the control effected through control of the rate of flow of a cold fluid reactant into the system through a valve, and the control action being proportional action, for example by using a proportional band controller. System characteristics are determined through frequency response analysis, such as is discussed by E. F. Johnson, in his articles at pages 353 et seq., Vol 51, No. 8, and 64 F et seq., Vol. 52, No. 2, Chemical Engineering Progress (1955) and (1956) respectively.

The proportional band setting of an automatic control system is limited by the system which it controls. The gain in the controller can never be set greater than the attenuation in the system at the natural frequency, for otherwise the system will oscillate. The natural frequency is the frequency at which the output of the system lags the input by 180 degrees. Controller gain is the ratio of the amplitudes of the sine waves of the input of the system being controlled to the output of the system being controlled; similarly it is the ratio of the amplitude of the since waves of the output of the controller to the controller. A large gain in the controller is advantageous for achieving good control.

Figure 6:
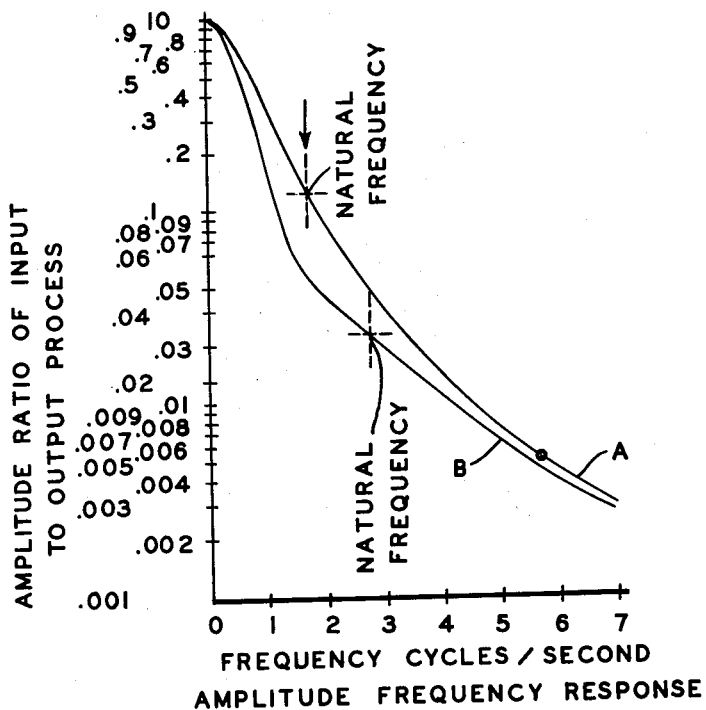
FIG. 6 shows curves of amplitude-frequency response of a prior art system and of the prior art system modified as in this invention.
Figure 7:
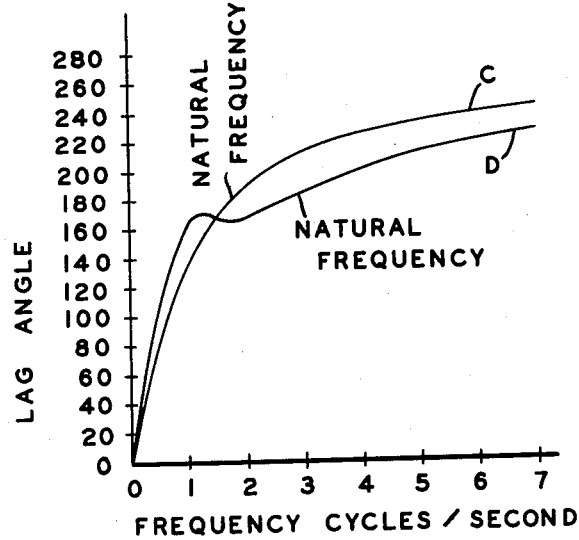
FIG. 7 shows lag angle-frequency response curves for the systems indicated in conjunction with FIG. 6.

Considering the process of FIG. 1 to be a three capacity system, having time constants of one second each and having a control valve with an amplitude gain of one, the amplitude-frequency response is that shown in curve A of FIG. 6 and the phase angle-frequency response is that shown in curve C of FIG. 7. From curve C of FIG. 7, the natural frequency of the system is found to be 1.73 cycles per second. Using that frequency with curve A of FIG. 6, it is found that the minimum proportional band setting that will achieve stability is 12.5 percent, since the amplitude ratio at that frequency is 0.125.

Figure 4:
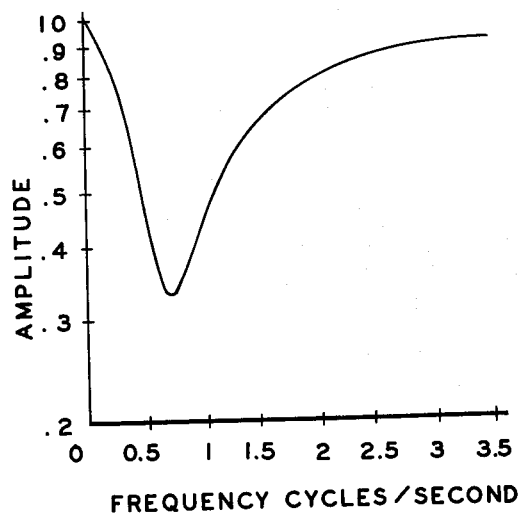
FIG. 4 is a curve of the amplitude-frequency characteristics of a bellows system as in FIG. 2 in conjunction with a proportional controller.
Figure 5:
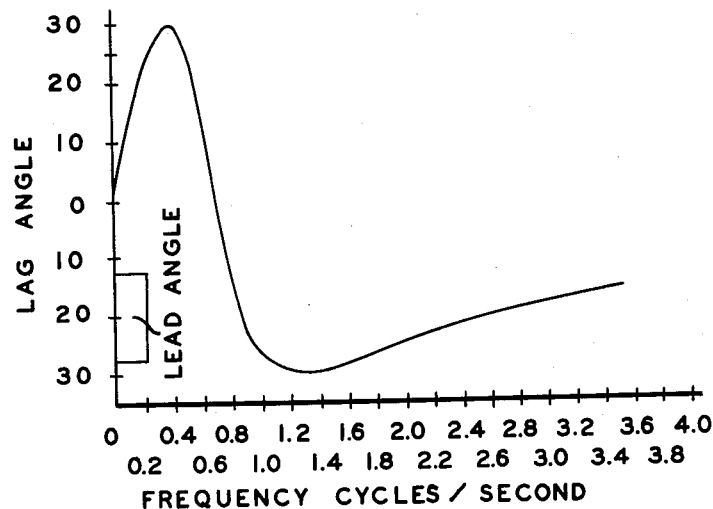
FIG. 5 is a curve of the lag angle-frequency characteristics of a bellows system of FIG. 2 with a proportional controller.

The improvement derived by my invention in that system is achieved, for example, by interposing a means such as that shown in FIG. 2 for item 24 of FIG. 1. The amplitude response of such a pneumatic relay system having a 2/1 ratio between the time constants of the pressure exerted by bellows 43 ($P_3$) and the pressure exerted by bellows 42 ($P_2$) and a force balance ratio of 2 to 1, will be patterned after that shown in FIG. 4 and the phase angle response follows that shown in FIG. 5. It can thus be observed that the amplitude of the relay output signal goes through a minimum and then increases to the initial value. From the phase angle data shown in FIG. 5 it can be observed that the phase angle is initially a lag angle and then becomes a lead angle at increased frequencies. At extreme frequencies, either very low or very high, the phase angle is zero.

The frequency response of the combined pneumatic relay system and the process controller is also shown in FIGS. 6 and 7; this is based on the assumption that the relay used has time constants of 0.476 and 0.952. Curve B in FIG. 6 shows the amplitude frequency response and curve D of FIG. 7 shows the phase angle frequency response of the combined system. The amplitude frequency response curve B was obtained by multiplying curve A of FIG. 6 and that of FIG. 4. The phase angle was obtained by summing the phase angles of curve C of FIG. 7 and that of FIG. 5.

From curve D of FIG. 7, it is noted that the natural frequency of the combined system is 2.75 cycles per second, a considerably higher value than that of the system without my modification. Using that frequency with curve B of FIG. 6, it is seen that the minimum proportional band setting that will achieve stability of operation with the combined system is 2.3 percent since the amplitude ratio at the new frequency is 0.023. Accordingly, if the system without my modification were controllable to ±55° F., the use of my invention would make it controllable to ±10° F. without encountering oscillation. Hence, a remarkable improvement of a factor of over 5 results as a consequence of my invention.

The ratios chosen for the foregoing discussion were purely arbitrary, not optimum, but serve to demonstrate the advantage that can be secured with the added high lag analogue and the subtracted low lag analogue of the traveling signal. Other ratios could be used as well as different order lags. In commercial application, the choice of such values would be based on the frequency response desired and the particular equipment used.

Figure 8:
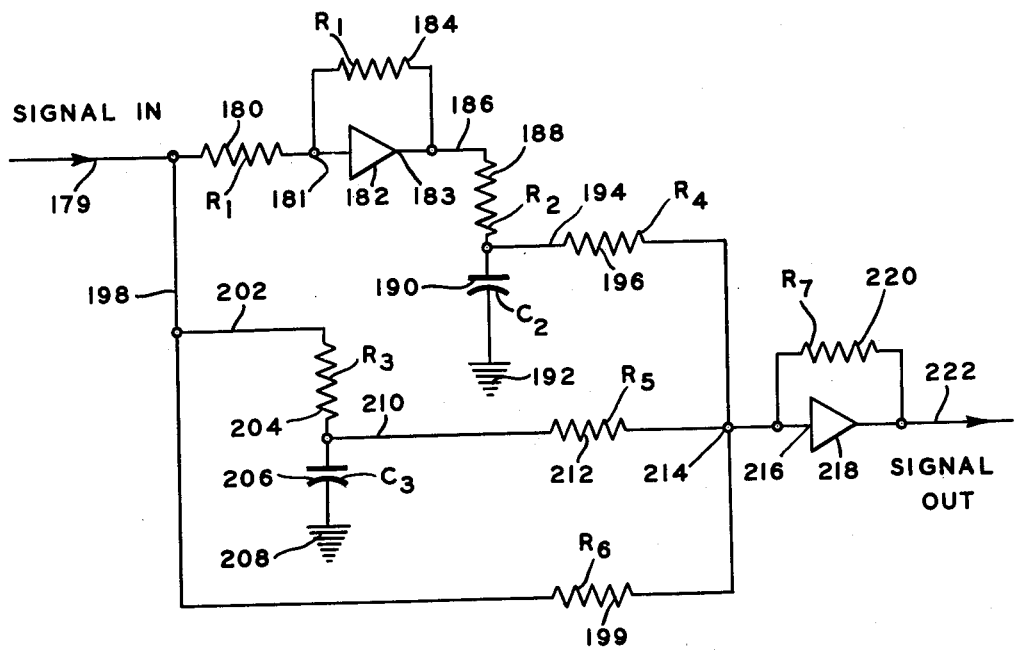
FIG. 8 shows an electrical analogue of the bellows system of FIG. 2.

As noted above, the present invention can be practiced with summing systems other than those operative on air pressures or other pneumatic means. For example, a typical electrical system that can be used, and which is the electrical analogue of the pneumatic system of FIGURE 2 already discussed, is shown in FIG. 8. This system is comprised of a plurality of resistances, capacitances, and operational amplifiers, the latter being a means that is conventional and widely used in analogue computer systems.

Referring to the drawings, the arithmetic equal of the input signal in line 179, which signal is a varying D.C. voltage, is applied across a first resistance 180. The voltage applied across this resistance generates a current which flows into the input node 181 of a first operational amplifier 182. In accordance with the common characteristics of an operational amplifier, an output voltage of a reverse sign to that of the input voltage to the amplifier is thereby produced at its output side 183. The output voltage acting through a resistance 184 across the amplifier generates a current flowing into the input node 181; if the current flowing in resistance 180 does not equal the current flowing in resistance 184, then the output voltage of the amplifier changes until these currents are equal and there is no net inflow of current to the amplifier. That is, until the negative current from resistance 184 is equal to the positive current from resistance 180. Operational amplifier 182 therefore generates a negative signal of equal amplitude and this passes by a coductor 186 to a resistance 188 which is in series with a capacitor 190. The other side of the capacitor is grounded at 192. A tap-off conductor 194 is placed between the resistance 188 and capacitance 190. The first order lag obtained across capacitance 190 is led through tap-off 194 through a resistance 96 which thereby generates current which is proportional to that negative first order lag signal.

A second portion of the input signal is led through conductor 198 to resistance 199 where a current proportional to the signal voltage is generated. The input signal voltage also acts via conductor 202 through a resistance 204 which is in series with a capacitor 206 grounded on its one side at 208. A tap-off line 210 between resistance 204 and capacitor 206 receives the first order lag signal generated across the capacitor. This in turn is led through resistance 212 where a current that is proportional to that first order lag signal is generated.

The negative current produced in resistance 196 which is a first order lag signal of the input signal, the positive first order lag current produced in resistance 212 and the zero order current produced in resistance 199 are brought together and fed through a line 214 to the input side 216 of a second operational amplifier 218. The input to this operational amplifier thus is the sum of currents from resistance 199 and resistance 212 minus the current of resistance 196. The operational amplifier 218 thus produces an output voltage of reverse sign which is fed back to its input side 216 through the resistance 220. The amplifier will now adjust the output voltage until the current flow through resistance 220 equals the current flows (and sum) of the resistances 196, 199 and 212. The resultant signal from the system passes through conductor 222 and is returned to the control loop for control purposes.

It will be apparent that the ratio of the time factors involved in resistance 188 and capacitor 190 determines the constant of the negative first order lag produced and the ratio of the time variable in resistance 204 to that of capacitor 206 shift the time constant for the other first order lag produced. Of course, the value of resistances 196, 199 and 212 shift the ratio at which these three signals are added and the resistance valve for resistance 220 determines the ratio of the output signal through line 223 to the input signal to the system.

The present invention can also be applied effectively in conjunction with rate control action. Standard rate action involves controller action that is proportional to the time rate of change and the deviation from the set point. Rate action provides a lead angle between the input signal and the output signal while it also results in an amplitude multiplication effect at higher frequencies. The lead angle is very desirable but the amplitude multiplication is very undesirable. The advantage of a lead angle outweighs the amplitude multiplication and for that reason rate action is adopted where a lead angle is useful. The lead angle results in a higher natural frequency, and the system has a substantially increased attenuation which is much greater than the increased amplitude that accompanies normal rate action. Accordingly, a narrower proportional band setting could be used than would be possible in the absence of rate.

In the present invention, an improved rate action is provided that, as compared with normal rate, results in both a considerably smaller amplification ratio and a higher lead angle. The improved rate control of my invention is based on subtracting a low time constant and adding a high time constant to the input signal. A typical pneumatic relay system by which this may be achieved is shown in FIG. 9.

Referring now to FIG. 9, a first portion of an input signal coming to the modified relay through input line 252 is passed through line 253 to a first bellows 254. The input signal is of zero order and exerts a counterclockwise force or moment about the fulcrum 255 that supports the force bar 256. A second portion of the input signal is passed through a line 257 to a second bellows 258, which cojointly acts on the force bar 256 with a fourth bellows 270. The pressure to bellows 258 is a zero order pressure. A third portion of the input signal from line 252 is passed through a flow restriction 260 to a volume tank 261 and then through line 262 to a third bellows 263. This third bellows is positioned to exert a clockwise moment about the fulcrum 255 through the force bar 256. The combination of the flow restriction 260 and the volume tank 261 comprises a first order lag or R.C. circuit and hence the pressure to bellows 263 is a first order analogue of the input pressure in line 252.

The lag analogue pressure produced in the R.C. circuit comprising the valve 260 and the volume chamber 261 is passed through a second flow restriction 266 and volume tank 267 and then through line 268 to the fourth bellows 270. The fourth bellows in combination with the second bellows 258 exerts a counterclockwise motion about the fulcrum 255. The pressure to the fourth bellows 270 is a second order lag analogue of the input pressure in line 252, since it was produced by two resistance-capacitance circuits in series, the first comprising flow restriction 260 and volume tank 261 and the second comprising flow restriction 266 and volume tank 267.

The output pressure of the bellows system is exerted by a fifth bellows 272 and is fed to the control loop through a line 274. The fifth bellows 272 is provided with a pilot relay system comprised of a vessel 276, an air supply line 277, an air line 278 to bellows 272, an air line 280 and nozzle 281 at a flapper valve 282 on force bar 256. This controls the air pressure in bellows 272 in response to force bar movement in the same manner as described in conjunction with FIG. 2. Hence, the output of the fifth bellows 272 will be the sum of the pressures exerted by the other bellows on the force bar.

A variant to achieve the same functional result as that of the device of FIG. 9 is shown in FIGURE 10. In that drawing a pair of pneumatic relays are used so that internal modification of a given commercial relay need not be made.

Referring now to FIG. 10, the input signal through line 352 is passed through a line 353 to a first bellows 354 and thereby exerts a counterclockwise motion around fulcrum 355 of force bar 356. A second portion of the input signal passes through line 357 to a second bellows 358 that also exerts a counterclockwise moment about a fulcrum 355. A third portion of the input signal is passed to a first flow restriction 360 and then to volume tank 361. The RC circuit comprising flow restriction 360 and volume tank 361 thus produces a lag analogue of the input signal, and it is exerted through line 362 on the third bellows 363. The third bellows is positioned to exert a clockwise moment about the fulcrum 355. The sum of the pressures in bellows 354, 358 and 363 is that which is exerted by the fourth bellows 365 and is then delivered through an output line 366 from the first relay to the first or input bellows 368 in the second relay. The summing of pressure so that bellow 365 responds thereto is effected by pilot relay system comprised of a vessel 400, an air supply line 401, an air line 402 to bellows 365, an air line 404 and nozzle 405 at a flapper valve 406 on force bar 356, and operates as described with FIG. 2.

The pressure thus provided in bellows 368 exerts a counterclockwise moment in the force bar 370 of the second relay about its fulcrum 372. The time delay signal or lag analogue of the original input signal in 352 which is provided by the RC circuit comprising flow restriction 360 and volume tank 361, in addition to being exerted on bellows 363 of the first relay, is also passed through a line 376 and line 378 to a second bellows 380 in the second relay. Hence, the pressure exerted in bellows 380 is a first order lag analogue of the input signal in line 352 and is exerted clockwise about fulcrum 372 in the second relay. That pressure is also exerted on the third bellows 384 of the second relay, after first passing through a flow restriction 386 and then to a volume tank 388. The pressure in bellows 384, having been provided through two RC circuits in series, is a second order lag analogue of the input pressure in line 352 and exerts a counterclockwise moment about fulcrum 372 in the second relay. The fourth bellows 394 in the second relay exerts a pressure which is the sum of the pressures in bellows 368, 380 and 384 and feeds it through output line 396 back to the system for control purposes. For this purpose there is provided a pilot relay system comprised of a vessel 410, an air supply line 412, an air line 413 to bellows 394, an air line 414 and nozzle 416 at a flapper valve 417 on force bar 370, and operates as described hereinbefore.

The results obtained upon using this improved rate system are evidenced in the series of curves shown in FIGS. 11 to 14. FIG. 11 shows the amplitude ratio versus frequency of conventional rate and improved rate. FIG. 11 shows the lead angle generated by normal rate and the improved rate. The frequency response given in FIGS. 11 and 12 for the improved rate are not optimized. Even better results can be obtained by varying the constants in the equation, hereinafter given, and by making various changes in the time constants and the order of the lag signal.

For the curves of FIGS. 11 and 12, the improved rate is given by the following equation:

$$P = 10P_2 + 11P_0 - 20P_1$$

where
$P$ = output signal pressure
$P_0$ = input signal
$P_1$ = first order lag signal with time constant $\tau$.
$P_2$ = second order lag signal with time constant $2\tau$. This is 2 first order capacitance lags in series with each lag having a time constant of $\tau$.

It can be seen from the curves in FIGS. 11 and 12 that the improved rate will generate a higher lead angle with a smaller amplitude ratio than will the normal rate system at low frequencies.

In demonstrating the effects of applying normal rate and the improved rate system, a 3 capacity system with a transport lag was chosen. The time constants were 1 minute for each of the three capacity lags and 0.35 minute for the transport lag. The data obtained are plotted in FIGS. 12 and 13. The curves labelled normal system give the frequency response of the normal system with no rate action. The natural frequency (FIG. 14) is 1.25 cycles/min. and the critical proportional band setting found at that frequency in FIG. 13 is 24.5 percent.

Figure 13:
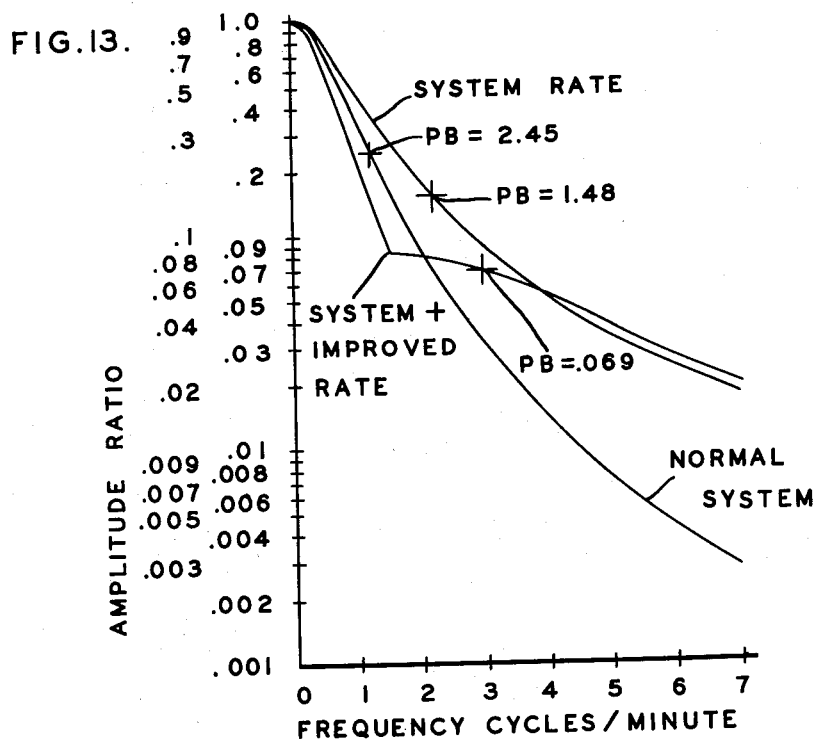
FIG. 13 shows curves of amplitude ratio versus frequency of a process with proportional control, with proportional control plus normal rate and of a combined proportional control plus the improved rate of this invention.

The effect of conventional rate is shown in FIGS. 12 and 13 by the curves labelled "System+Rate." These curves were prepared using a rate time constant of 0.9 minutes. It can be seen that normal rate will reduce the lag angle but increase the amplitude ratio. One factor helps control while the other hinders controllability, but overall there is an improvement. The natural frequency is now 2.27 cycles/min. and the proportional band is 14.8 percent.

Figure 14:
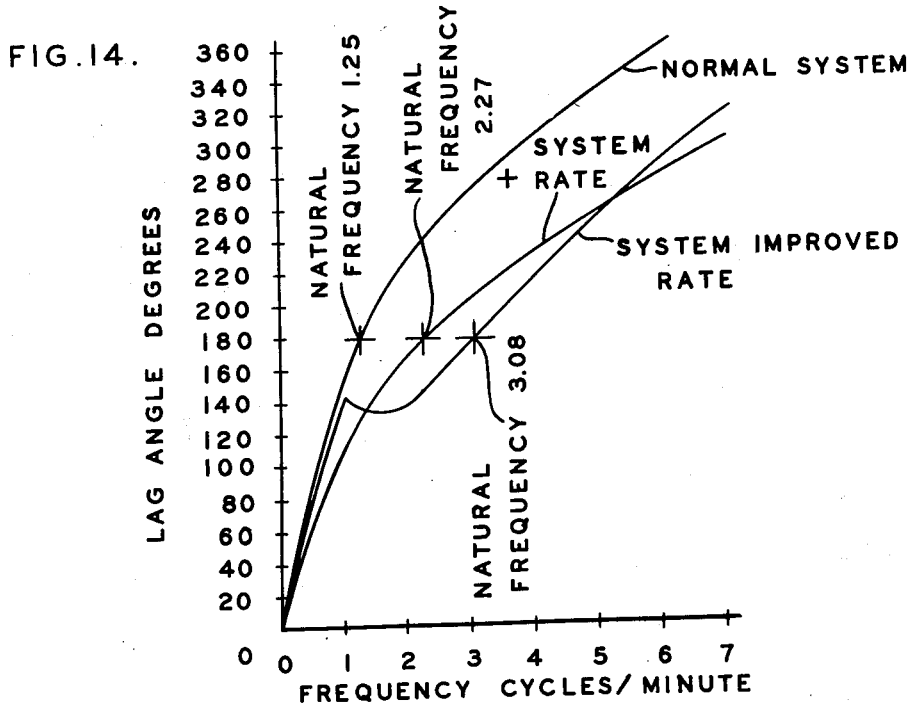
FIG. 14 shows curves of the lag angle versus frequency of the systems indicated in conjunction with FIG. 12.

The effect of the improved rate control action is shown in FIGS. 13 and 14 by the curves labelled, "System+Improved Rate." These curves were prepared using the improved rate system given in FIGS. 13 and 14 with a time constant of 0.2. The natural frequency is now 3.08 and the critical proportional band is 6.9 percent.

In summary, the system with no rate action will have a proportional band of 24.5 percent; with normal rate will have a 14.8 percent band and the improved rate will have a 6.9 percent band.

From the foregoing description and discussion, it is evident that my invention provides a uniquely simple manner of securing highly advantageous control in automatic control facilities. One special advantage is that application of the invention can be readily made without requiring special tooling or training. For example, in one successful trial of the invention, a conventional Bailey P99-3 computing relay was modified by adding valves and volume chambers to the device as originally received and then used as in this invention. It will be apparent to the artisan that numerous changes be made without departing from the scope of the invention.

The invention has been described primarily as it relates to proportional control, for such type control appears to have the highest present day commercial acceptance. However, as will be apparent to those skilled in the art upon consideration of the foregoing discussion, the invention is not thus limited and can be applied to advantage to any control action wherein the controlled element is movable to more than two points or settings. For example, it can be used with single speed floating control as well as with proportional speed floating control. Moreover, instead of using the invention in lieu of ordinary rate action, it can be added to or combined with a system that comprises proportional control plus ordinary rate. The invention can also be used to advantage where integral control is applied. Other applications will occur to those skilled in the art.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. The combination with apparatus for regulating a variable including a controller for producing an output signal to secure controller action which follows proportionally the magnitude of an input signal from said variable to said controller, of means to provide different first and second lag analogues of at least a first order value of said input signal, and means to add said lag analogue having the larger time constant and subtract the other of said lag analogues from said input signal.

2. In combination with a pneumatic relay comprising a force bar, a fulcrum for said force bar, four bellows arranged to apply two clockwise and two counterclockwise moments to said force bar, and means applied to a first of said bellows to adjust the force exerted thereby on said force bar whereby that bellows balances the sum of the moments of the other three bellows and maintains said force bar in its equilibrium position; means to apply a zero order signal to a second of said bellows whereby a moment is produced in said force bar around said fulcrum, means to create a lag analogue of at least a first order of said zero order signal and to apply said lag to a third of said bellows and thereby produce a moment in said force bar about said fulcrum that is opposite to that of said second bellows, and means to create another lag analogue of at least a first order of said zero order signal and to apply it to said fourth bellows and thereby produce a moment in said force bar about said fulcrum in the same direction as said moment of said second bellows, said means to create said second lag analogue having a higher time constant than said means to create said first lag analogue.

3. The combination with apparatus for regulating a variable including a controller for producing an output signal to secure controller action which follows proportionally the magnitude of an input signal from said variable to said controller, and further including means to compensate for time lags in a control loop and system by altering controller response in proportion to the rate at which said variable departs from its desired level, of means to provide different first and second lag analogues of at least a first order value of said input signal to said controller, and means to add said lag analogue having the larger time constant and subtract the other of said lag analogues from said input signal.

4. In combination with apparatus for automatically regulating a variable through a controller for producing an output signal to secure control action which is proportional to the time rate of change and the actual deviation of the variable from a preselected value thereof, means for producing a first lag analogue of a control signal from said variable of at least a first order value and of a first time constant and magnitude, means for producing a second lag analogue of said control signal from said variable of at least a first order but of a lower time constant and a higher magnitude than said first lag analogue, and means to add to said control signal from said variable said first lag analogue and to subtract said second lag analogue therefrom.

5. In combination with an automatic controller including four pressure-responsive force-producing units and means to sum the force produced by three of said four units and thereby cause the fourth unit to respond with a force equal to said sum, a fifth pressure-responsive force-producing unit, said fifth unit jointly cooperating with one of said first three units to exert an increasing effect on the response of said fourth unit, said other two of said first three pressure-responsive force-producing units being arranged in opposed relationship to one another with respect to influencing the response of said fourth unit, means to deliver a signal pressure to a first of said other two units, means to deliver said signal pressure to said fifth unit, a first flow restriction and a fluid capacitance means in pressure responsive relationship to the other of said two other units, means to deliver said signal pressure to said first flow restriction means and capacitance means, means to deliver the lag analogue of said signal pressure to said other of said two other units, second flow restriction means and fluid capacitance means, means to deliver said lag analogue of said signal pressure to said second flow restriction means and fluid capacitance means, and means to deliver the lag analogue of said signal pressure from said second flow restriction and fluid capacitance means to said unit jointly cooperating with said fifth unit.

6. The combination with apparatus for regulating a variable including a controller for producing an output signal to secure controller action which follows proportionally the magnitude of an input signal from said variable to said controller, of means to create a lag analogue of said input signal of at least a first order value and add said lag analogue to said input signal, means to create a second lag analogue of said input signal of at least a first order value but with a lower time constant than said first lag analogue and means to subtract said second lag analogue from the addition product of said input signal and said first lag analogue thereof.

7. The combination with apparatus for regulating a variable including a controller for producing an output signal to secure controller action which follows proportionally the magnitude of an input signal from said variable to said controller, and further including means to compensate for time lags in a control loop and system by altering controller response in proportion to the rate at which said variable departs from its desired level, of means to provide different first and second lag analogues of at least a first order value of said input signal, and means to add said lag analogue having the larger time constant and subtract the other of said lag analogues from said input signal.

8. In combination with apparatus for automatically regulating a variable through a controller, operable on a means movable to at least two settings, for producing an output signal to secure control action which is responsive to the magnitude of an input signal from said variable, means to provide different first and second lag analogues of at least a first order value of said input signal and means to add said lag analogue having a larger time constant and subtracting the other of said analogues from said input signal.

9. The combination with apparatus for regulating a variable including a controller for producing an output signal to secure controller action which follows the magnitude of an input signal from said variable to said controller, of means to provide a first lag analogue of a first magnitude of at least a first order value of said input signal, means to provide a different second lag analogue of a second magnitude of a second time constant and of at least a first order value of said input signal and means to add said lag analogue having a larger time constant and subtracting the other of said lag analogues from said input signal.

References Cited in the file of this patent

UNITED STATES PATENTS

| 2,512,561 | Ziegler | June 20, 1950 |
| 2,666,576 | Hirsch | Jan. 19, 1954 |
| 2,677,385 | Markson | May 4, 1954 |
| 2,737,964 | Olah | Mar. 13, 1956 |
| 2,965,300 | Radley et al. | Dec. 20, 1960 |

FOREIGN PATENTS

| 536,537 | Great Britain | May 19, 1941 |

UNITED STATES PATENT OFFICE
CERTIFICATE OF CORRECTION

Patent No. 3,126,904                                            March 31, 1964

Thomas A. Ciarlariello

It is hereby certified that error appears in the above numbered patent requiring correction and that the said Letters Patent should read as corrected below.

Column 2, lines 18 and 21, for "narrow", each occurrence, read -- narrower --; column 4, line 71, strike out "is then", second occurrence; column 5, line 1, for "first", second occurrence, read -- order --; lines 13 and 14, for "convention" read -- conventional --; line 44, for "flucrum" read -- fulcrum --; same column 5, lines 47 and 48, the designations "$P_{41}$", "$P_{43}$", and "$P_{42}$" should be enclosed in parentheses; column 6, line 29, for "since" read -- sine --; line 30, before "controller", first occurrence, insert -- input to the --; column 8, line 12, for "valve" read -- value --; column 9, line 28, for "bellow" read -- bellows --.

Signed and sealed this 14th day of July 1964.

(SEAL)
Attest:

ESTON G. JOHNSON                                              EDWARD J. BRENNER

Attesting Officer                                             Commissioner of Patents